United States Patent [19]

Fühner et al.

[11] Patent Number: 4,669,672

[45] Date of Patent: Jun. 2, 1987

[54] FOOD PROCESSOR

[75] Inventors: Hubert Fühner; Stefan Henn, both of Solingen, Fed. Rep. of Germany

[73] Assignee: Robert Krups Stiftung & Co. KG., Solingen, Fed. Rep. of Germany

[21] Appl. No.: 645,439

[22] Filed: Aug. 29, 1984

[30] Foreign Application Priority Data

Sep. 24, 1983 [DE] Fed. Rep. of Germany ....... 3334637
Jul. 10, 1984 [EP] European Pat. Off. ............ 3425361
Jul. 10, 1984 [EP] European Pat. Off. ....... 84 108 059.1
Jul. 10, 1984 [DE] Fed. Rep. of Germany ....... 3425363

[51] Int. Cl.$^4$ ............................................. B02C 23/28
[52] U.S. Cl. ........................................ 241/57; 241/92; 261/DIG. 16; 366/102
[58] Field of Search ....................... 366/102, 103, 104; 261/121 R, 122, 124, DIG. 16; 241/57, 282.1, 282.2, 92, 285 R, 59, 58, 55, 56

[56] References Cited

U.S. PATENT DOCUMENTS

| 1,993,338 | 3/1935 | Crowe | 261/DIG. 16 X |
| 4,002,323 | 1/1977 | Grun | 366/102 |
| 4,367,667 | 1/1983 | Shibata | 241/92 X |
| 4,456,185 | 6/1984 | Ribassin et al. | 241/282.2 X |

FOREIGN PATENT DOCUMENTS

707300 5/1941 Fed. Rep. of Germany .
1164618 3/1964 Fed. Rep. of Germany .

*Primary Examiner*—Mark Rosenbaum
*Attorney, Agent, or Firm*—Peter K. Kontler

[57] ABSTRACT

A food processor wherein a shaft which extends into the interior of a bowl is driven by an electric motor employs a whipping tool having a hub which receives torque from the shaft, either directly or through the medium of an adapter, and a disc-shaped portion. The underside of the disc-shaped portion is immediately adjacent to the upper side of the bottom wall of the bowl and has ribs separating radially extending channels each having an inlet in the region of the hub and one or more outlets at the periphery of the tool. When the tool rotates, the inlets draw air or receive air from a system of passages, and the channels discharge the thus admitted air into the material (such as cream, egg whites or mayonnaise) which gathers at the periphery of the tool so that the material is thoroughly mixed and is also whipped by admission of finely atomized air. The tool can process large or very small quantities of foodstuffs without changing its RPM. The inlets can be defined by hood-shaped upwardly extending portions of the tool or they may constitute openings in the flat disc-shaped portion of the tool.

13 Claims, 17 Drawing Figures

FOOD PROCESSOR

BACKGROUND OF THE INVENTION

The present invention relates to food processors in general, and more particularly to improvements in food processors of the type which can be used as blenders, mixers and/or for analogous purposes, e.g., to whip cream, mayonnaise, egg whites and similar foodstuffs. Still more particularly, the invention relates to improvements in food processors of the type wherein a rotary tool is permanently or removably installed in the interior of a bowl to stir and otherwise process the introduced edible material or materials.

It is already known to provide the housing of a food processor with a base which supports a bowl. The bowl can be fixedly attached to the base and its bottom wall is traversed by a spindle or shaft which extends into the interior of the bowl and constitutes the output element of the means for rotating one or more tools. The shaft is provided with suitable coupling elements which can be placed into mesh with complementary coupling elements on any one of a number of various tools so as to drive the selected tool and to thereby enable the machine to perform a slicing, dicing, grating, kneading and/or other operation upon the substance or substances which are admitted into the bowl.

It is also known to construct a food processor in such a way that a bowl or an otherwise configurated receptacle can be placed onto the output element of the motor. Such types of food processors are preferred when the bowl invariably contains one and the same type of tool which is coupled to the motor as soon as the bowl is properly installed on a suitable base. Each of a series of discrete bowls can contain a different tool, e.g., one for kneading of dough, one for slicing vegetables or the like, one for chopping meat, one for dicing certain types of foodstuffs, and so forth.

In many instances, a tool which is used in a food processor comprises a centrally located torque receiving hub and one or more blade-like portions which extend outwardly from the hub and serve to treat the material or materials in the bowl. As a rule, each such tool will have not less than two blade-like portions which are then disposed diametrically opposite each other, or three or more blade-like portions which are equidistant from one another, as considered in the circumferential direction of the hub. The blades can be disposed at different levels from the bottom of the bowl, and one or more blades can be provided with protuberances in the form of beads, studs or the like to effect a more pronounced agitation and/or other type of processing of the material or materials in the bowl. Such types of tools can be used for comminuting, stirring and similar purposes.

A drawback of presently known food processors and their presently known tools is that they are not ideally or even reasonably suited for the treatment and processing of certain types of foodstuffs, such as mayonnaise, milk cream and egg whites. It has been found that conventional food processors cannot properly whip cream, egg whites or the like even if the bowl contains a relatively large quantity of such material. The results are even less satisfactory if the user wishes to whip a relatively small quantity of cream or the like.

Attempts to overcome such drawbacks of known food processors involve the utilization of complex, bulky, sensitive and expensive step-down transmissions or other types of (normally electrical) controls which are designed to drive the shaft for the tool in the bowl at a fraction of the normal speed. This greatly increases the initial and maintenance cost of the machine but still fails to ensure satisfactory results. In fact, the results of the processing of cream, mayonnaise, egg whites and the like are often totally unsatisfactory so that the processed material must be discarded.

OBJECTS AND SUMMARY OF THE INVENTION

An object of the invention is to provide a novel and improved food processor which can process large or small quantities of cream, mayonnaise, egg whites and similar foodstuffs with the same degree of efficiency.

Another object of the invention is to provide the food processor with a novel and improved whipping tool for egg whites and similar foodstuffs.

A further object of the invention is to provide a food processor which can process large or small quantities of the above outlined and similar foodstuffs with the same degree of efficiency without the need for complex stepdown transmissions and/or other speed varying and regulating means.

An additional object of the invention is to provide a novel and improved method of admitting air into a mass of mayonnaise, cream or a similar foodstuff which is confined in the bowl of a food processor.

Another object of the invention is to provide novel and improved means for rotating a whipping tool in a food processor.

Still another object of the invention is to provide a food processor which embodies the above outlined tool.

A further object of the invention is to provide a whipping tool which can be used in conventional food processors as a superior substitute for heretofore known tools.

An additional object of the invention is to provide a food processor with novel and improved means for directing air into the range of a whipping tool, particularly a whipping tool of the above outlined character.

Another object of the invention is to provide a novel and improved adapter for use in a food processor of the above outlined character to transmit torque to the improved whipping tool.

The invention is embodied in a food processor which comprises a bowl having a bottom wall, and a substantially disc-shaped rotary whipping tool which is disposed in the bowl and has a plurality of channels adjacent to the bottom wall and extending substantially radially of the tool. Each channel has an air-admitting inlet nearer to and an air-discharging outlet more distant from the axis of rotation of the tool. The food processor further comprises means for rotating the tool with reference to the bowl to thereby establish the flow of air through the channels and into the food (e.g., milk cream, mayonnaise or egg whites) which is confined in the bowl. The rotating means preferably comprises a prime mover and means for transmitting torque from the prime mover to a central portion (e.g., a hub) of the whipping tool. The outlets of the channels are preferably provided at the periphery of the tool.

That side of the tool which faces the bottom wall is preferably provided with a plurality of partitions (e.g., in the form of straight ribs) which are closely adjacent to the bottom wall of the bowl and separate the channels from each other. The undersides of the channels can be open and the bottom wall of the bowl can at least substantially seal the undersides of the channels to ensure predictable flow of air from the inlets to the respective outlets.

In accordance with one presently preferred embodiment of the invention, the tool is provided with several substantially hood-shaped portions which surround the hub and extend from the upper side of a substantially disc-shaped second portion of the tool. Such hood-shaped portions define the aforementioned inlets which are thus located at a level above the upper side of the second portion of the tool. Each hood-shaped portion is preferably formed with an exposed upper surface which slopes downwardly toward the upper side of the second portion of the tool, and the inlets face in the direction of rotation of the tool to thus force the entry of air into the channels when the tool rotates. The upper surfaces of the hood-shaped portions slope downwardly counter to the direction of rotation of the tool in the bowl.

The tool can comprise a substantially centrally located tubular component which extends upwardly from the second portion and spacedly surrounds the hub. The tubular component has an air-supplying upper end which is remote from the upper side of the second portion of the tool, and such component defines the air-admitting inlets. Furthermore, one or more axial impeller blades or vanes can be provided in the space between the hub and the tubular extension to promote the flow of air toward the inlets.

The circumferential wall of the bowl is preferably slightly spaced apart from the periphery of the tool to define therewith an annular clearance for accumulation of the material which requires processing whereby the bubbles of air which leave the channels by way of the respective outlets penetrate directly into the material in such clearance.

The second portion of the tool can make an oblique angle with the axis of the hub; this enables the tool to wobble in the interior of the bowl and to produce a highly pronounced and often highly desirable mixing or stirring action. Also, one or more parts of the second portion of the tool can be bent or inclined upwardly (i.e., away from the bottom wall of the bowl) while the remaining part or parts of the second portion remain in a plane which is normal to the axis of the hub.

The food processor can further comprise means for guiding air into the inlets of the channels. Such air guiding means can include a second wall which is disposed below the bottom wall of the bowl and defines with the bottom wall at least a portion (e.g., an annular compartment) of at least one passage for the flow of air into the inlets. The housing of the food processor preferably includes a base which supports the bowl and includes the aforementioned second wall. The means for rotating the tool is installed in the housing, in part in the preferably hollow base. The air guiding means can further comprise a tubular extension provided on the bottom wall of the bowl and extending centrally through the tool into the upper or median portion of the bowl. The rotating means of such food processor can comprise a rotary adapter, means for coupling the adapter to the tool, and means for driving the adapter. The adapter and the extension preferably define at least one annular space which communicates with the aforementioned compartment and with the inlets. In adcordance with a presently preferred embodiment of the invention, the tubular extension and the adapter further define another annular space which is disposed between the one annular space and the inlets. The means for driving the adapter can comprise an upright shaft which is coaxial with the adapter and receives torque from the prime mover, and an electrically insulating sleeve which is interposed between the shaft and the adapter and has means for separably securing it to the adapter so that the latter is compelled to rotate with the sleeve. The securing means can comprise complementary coupling elements which are provided on the adapter and on the sleeve. Such coupling elements (as well as the elements of the coupling means between the adapter and the tool) can comprise annuli of mating teeth on the adapter and on the sleeve. The sleeve can include a substantially disc-shaped portion or leg which is disposed between the bottom wall of the bowl and the second wall and forms part of the aforementioned air guiding means in that the air streams which are drawn from the compartment between the two walls flow along the leg, into the aforementioned annular spaces between the tubular extension of the bottom wall and the adapter, and thence into the inlets of the channels at the underside of the tool. The underside of such tool can be provided with three equidistant radially extending partitions in the form of straight ribs which separate three channels from one another and are in actual contact with or in immediate proximity of the bottom wall of the bowl.

The inlets can constitute openings which are provided in the preferably flat or nearly flat disc-shaped second portion of the tool. Such openings are preferably adjacent to the hub of the tool and the aforementioned partitions preferably include portions which flank such openings to thus ensure that each opening admits air into a particular channel.

Another feature of the invention resides in the provision of a rotary whipping tool which has a centrally located torque receiving portion and a substantially disc-shaped second portion surrounding the torque receiving portion and defining at one of its sides a plurality of substantially radially extending air conveying channels. Such tool further comprises at least one inlet for each channel and at least one outlet for each channel.

The novel features which are considered as characteristic of the invention are set forth in particular in the appended claims. The improved food processor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
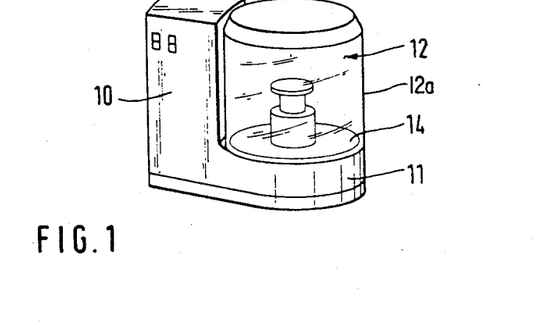
FIG. 1 is a schematic perspective view of a food processor with a whipping tool which embodies one form of the invention.

FIG. 1 shows a food processor which comprises a housing 10 containing the prime mover and various controls. The housing 10 includes a hollow base 11 supporting the bottom wall 13 (see FIG. 2) of a bowl 12. The means for admitting foodstuffs into the interior of the bowl 12 is not specifically shown in the drawing. The bowl 12 further accommodates a preferably detachable substantially disc-shaped whipping tool 14 which can be used for the treatment of cream, egg whites, mayonnaise and similar foodstuffs. The prime mover in the left-hand portion of the housing 10 is or can be a suitable electric motor (not specifically shown), and the base 11 contains various components of the means for transmitting torque from the output element of the motor to the centrally located torque receiving portion or hub 15 of the tool 14. The torque transmitting means can comprise toothed pulleys and one or more toothed belts serving to drive an upright shaft or spindle which is received in the blind axial bore 18 of the tool 14 when the latter is properly installed in the bowl 12. Such shaft extends through the bottom wall 13 of the bowl 12. The latter can constitute an integral part of the base 10. In such machines, the top portion of the bowl 12 is removable in order to afford access to the tool 14, for example, to replace this tool with a cutter in the form of a slicing, chopping or shredding disc, with a kneading tool, with a blending tool and/or with any other of a wide variety of tools which are used in conventional food processors. Each such tool is designed to fit onto the shaft which transmits torque to the hub 15 of the illustrated whipping tool 14. At least a portion of the bowl 12 preferably consists of a suitable light transmitting material so that the operator of the machine can observe the progress of the food processing operation.

The details of the whipping tool 14 are shown in FIGS. 2, 3, 4 and 5. In addition to the hub 15, this tool comprises a flat disc-shaped second portion 16 which is closely adjacent to the bottom wall 13 of the bowl 12. The plane of the disc-shaped portion 16 is normal to the axis of rotation of the tool 14 and the major part of the hub 15 extends upwardly beyond the upper side of the portion 16. The topmost part of the hub 15 constitutes a knob-shaped handle 17 by means of which the tool 14 can be lifted off the aforementioned shaft of the means for rotating the tool. It is clear that the illustrated handle 17 can be replaced with a knurled, ribbed or otherwise serrated handgrip portion of circular, oval or polygonal outline. One or more flats can be provided in the peripheral surface of the handle 17.

Figure 2:
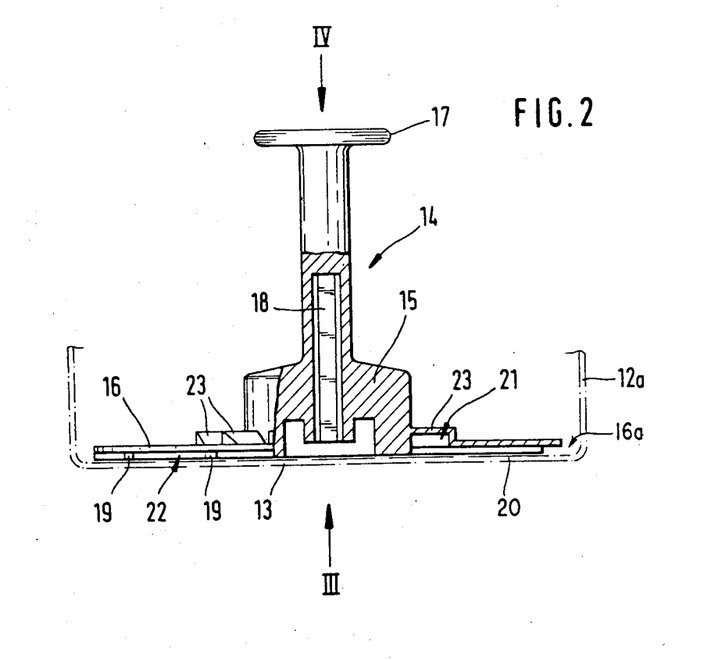
FIG. 2 is an enlarged partly elevational and partly axial sectional view of the whipping tool, a portion of the bowl being indicated by phantom lines.

The centrally located bore 18 of the hub 15 is bounded by a surface at least a portion of which is not circular so as to establish a reliable torque receiving connection with the aforementioned shaft of the means for rotating the tool 14 when the latter is properly installed in the bowl 12.

Figure 3:
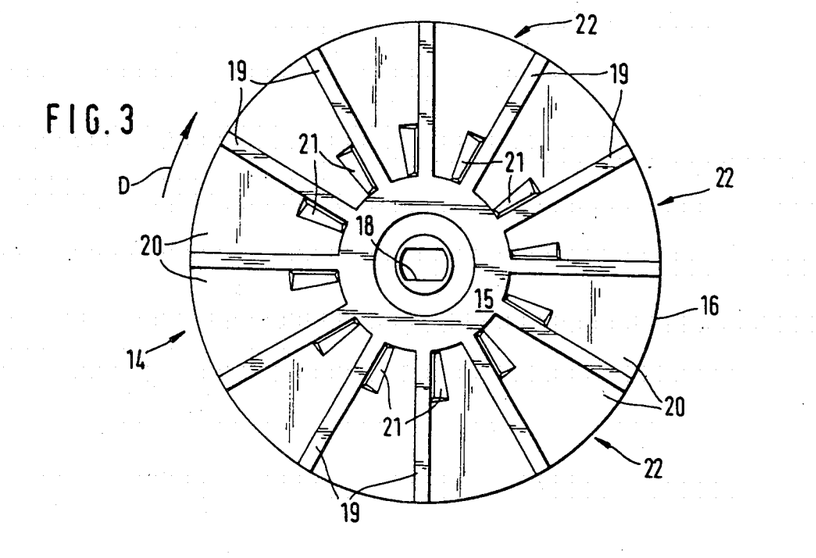
FIG. 3 is a bottom plan view of the whipping tool as seen in the direction of arrow III in FIG. 2.

As can be seen in FIG. 3, the underside of the disc-shaped portion 16 of the tool 14 is provided with substantially radially extending partitions in the form of straight ribs 19 disposed between radially outwardly diverging air channels 20 each having an inlet 21 close to the hub 15 and an outlet 22 in the region of the periphery of the disc-shaped portion 16. The undersides of the channels 20 are open but are at least substantially sealed by the upper side of the bottom wall 13 when the tool 14 is properly installed in the bowl 12. This can be seen in FIG. 2.

The inlets 21 are defined by substantially hood-shaped portions 23 of the disc-shaped portion 16. The portions 23 slope downwardly from the actual inlets 21 toward the upper side of the portion 16 counter to the direction (arrow D in FIG. 3) in which the tool 14 is rotated in actual use. Thus, the inlets 21 face in the direction of rotation of the tool so that air which is adjacent to the outer side of the hub 15 is forced to penetrate into the channels 20 when the tool is driven. The width of the inlets 21 (as considered in the radial direction of the tool 14) and the height of such inlets (as considered in the axial direction of the hub 15) can be selected by appropriate configuration of the corresponding hood-shaped portions 23. The foodstuff or foodstuffs in the bowl 12 do not interfere with the flow of air into the channels 20 via inlets 21 because the material which is located close to the external surface of the hub 15 (i.e., in the region of the inlets 21) when the motor in the housing 10 is started is propelled toward the circumferential wall 12a of the bowl 12 as soon as the tool 14 begins to rotate. The streams of air which enter the channels 20 via inlets 21 flow radially outwardly and enter the foodstuff via outlets 22 in the annular clearance 16a between the periphery of the disc-shaped portion 16 and the lowermost portion of the circumferential wall 12a at a level close to the upper side of the bottom wall 13. This ensures a highly predictable admission of air into the foodstuff (e.g., egg whites) in the bowl 12, irrespective of whether the bowl contains a large or even a very small quantity of a material which requires processing.

Figure 6:
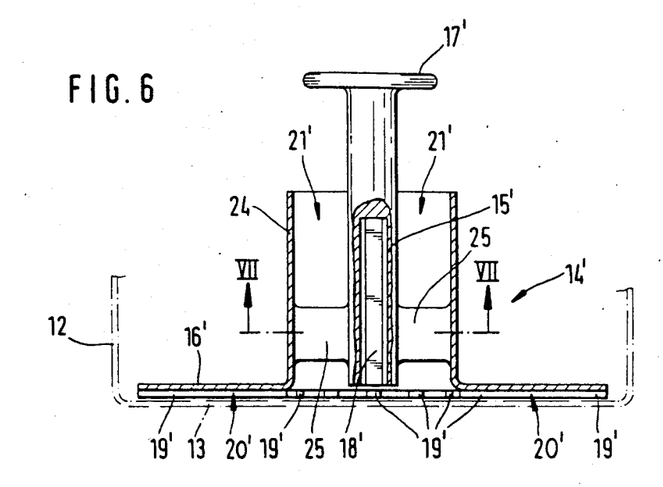
FIG. 6 is a partly elevational and partly axial sectional view of a second whipping tool, a portion of the bowl being indicated by phantom lines.
Figure 7:
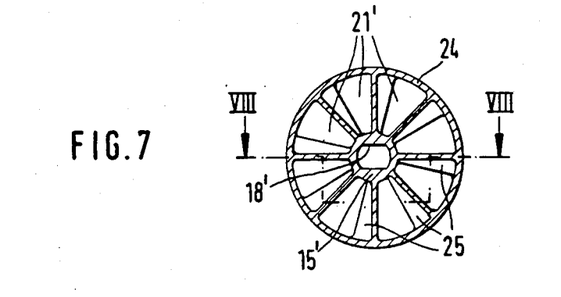
FIG. 7 is a sectional view as seen in the direction of arrows from the line VII—VII of FIG. 6.
Figure 8:
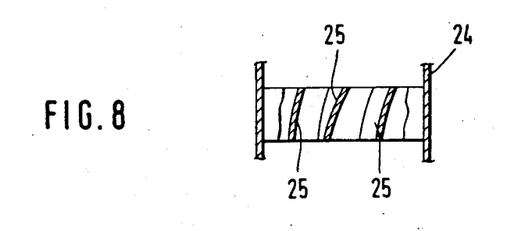
FIG. 8 is a sectional view as seen in the direction of arrows from the line VIII—VIII of FIG. 7.

FIGS. 6 to 8 show a modified whipping tool 14' whose hub 15' is substantially identical with the hub 15 of the tool 14 except that it is made integral with radially outwardly extending axial impeller blades 25 disposed in the interior of a tubular component 24 which is integral with and extends upwardly beyond the smooth upper side of the disc-shaped portion 16' of the tool 14'. The blades 25 separate the inlets 21' from one another, and each such inlet serves to admit a stream of air into one of several radially disposed channels 20' at the underside of the disc-shaped portion 16'. The outlets of the channels 20' are disposed at the periphery of the disc-shaped portion 16'. The channels 20' are separated from each other by partitions 19' in the form of flat ribs which are provided at the underside of the disc-shaped portion 16' and extend very close to or into actual contact with the upper side of the bottom wall 13 of the bowl 12.

As can be seen in FIGS. 7 and 8, the impeller blades 25 are suitably curved in dependency upon the direction of rotation of the tool 14' so as to ensure that they not only guide air streams in the interior of the tubular component 24 but that they also draw air from the interior of the bowl 12 and into the channels 20'. The blades 25 are sufficiently rigid to properly center the hub 15' in the tubular component 24 of the disc-shaped portion 16'. The height of the tubular component 24 is selected in such a way that its upper end is located at a level above the top surface of the edible material which is introduced into the bowl 12 before the tool 14' is set in rotary motion. This ensures that the inlets 21' are not clogged with a solid or liquid material prior to starting of the machine.

In all other respects, the mode of operation of the machine which embodies the tool 14' is the same as or clearly analogous to the mode of operation of the food processor which employs the tool 14 of FIGS. 1 to 5.

FIG. 7 shows that the axial bore or hole 18' in the hub 15' is bounded by a substantially oval surface to ensure adequate transmission of torque from the aforementioned shaft to the hub 15' and hence to the entire whipping tool 14'.

Figure 9:
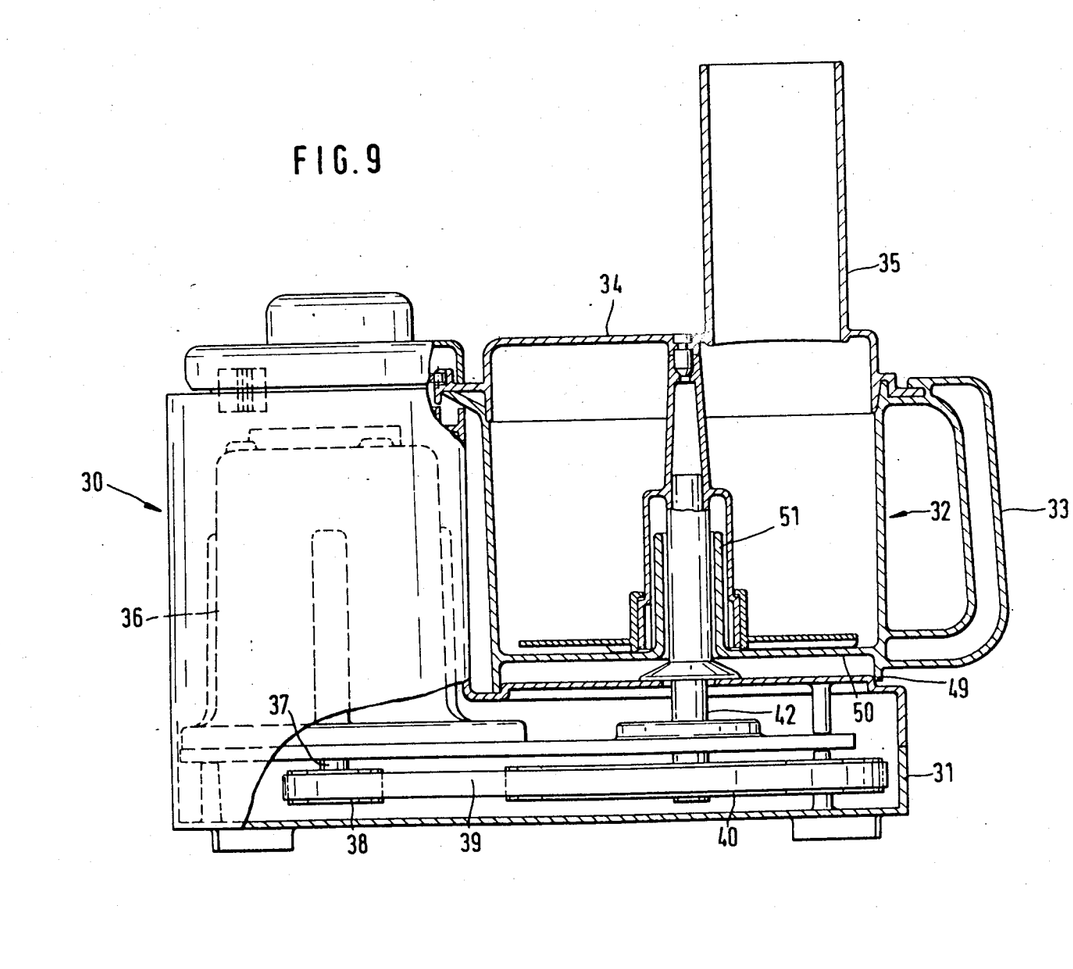
FIG. 9 is a partly elevational and partly vertical sectional view of a modified food processor, further showing a third whipping tool which is installed in the bowl of the food processor and receives torque from an adapter.
Figure 10:
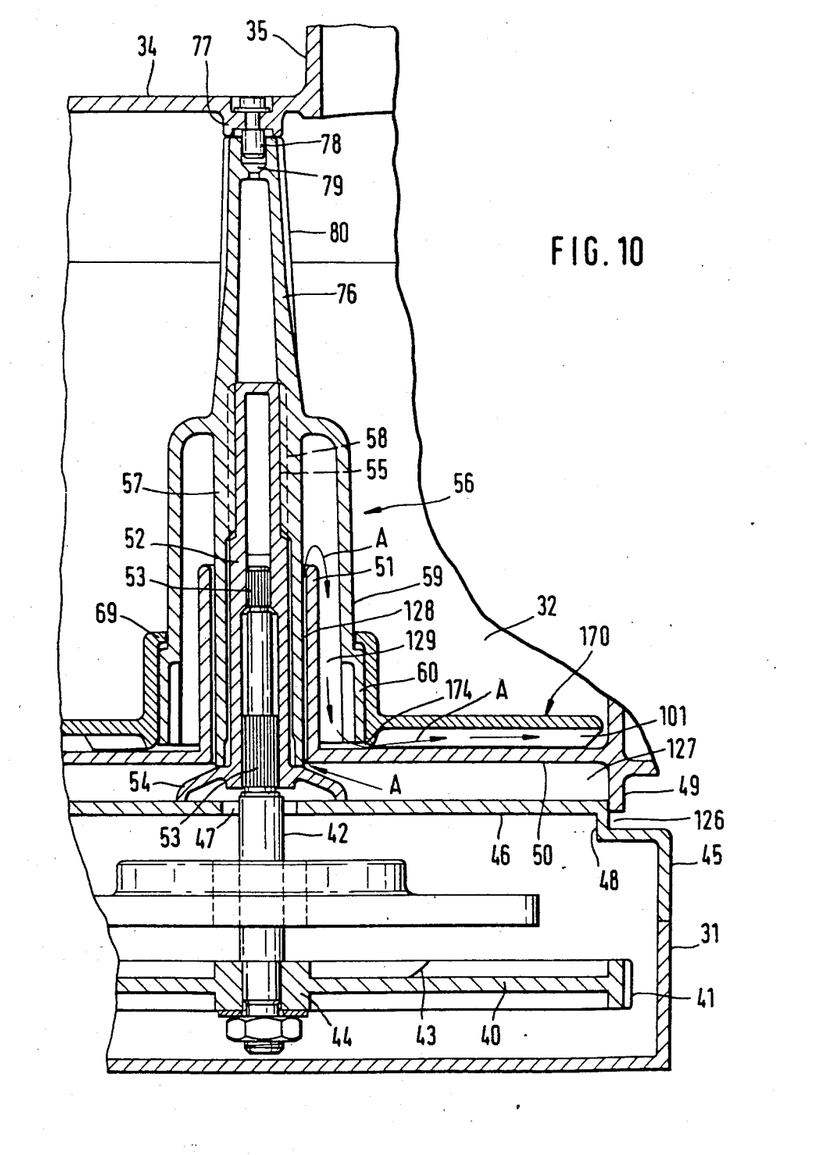
FIG. 10 is an enlarged vertical sectional view of a detail in the food processor of FIG. 9.

FIGS. 9 and 10 show a modified food processor which comprises a substantially L-shaped housing 30 for an electric motor and controls. The housing 30 includes a hollow base 31 whose top wall 46 supports a bowl 32 which is secured to the base 31 in any convenient way, e.g., with resort to a bayonet lock connection. The bowl 32 has a handle 33 and a removable cover or lid 34 provided with a material feeding tube 35. The cover 34 is detachable from the remaining part of the bowl 32 in a manner which is not shown in the drawing, e.g., with resort to a suitable bayonet lock type connection.

The means for rotating a whipping tool 170 in the bowl 32 comprises an electric motor which is installed in the left-hand portion of the housing 30 (as viewed in FIG. 9) and has an output shaft 37 serving to drive a toothed pulley 38. At least the major part of the motor in the housing 30 is concealed by a shroud 36. The pulley 38 is mounted in the hollow base 31, the same as a much larger second pulley 40. A toothed belt 39 is trained about the pulleys 38, 40 to transmit torque from the motor shaft 37 to a second shaft or tool spindle 42 which is coaxial and rigid with the pulley 40. The pulley 40 is a blower which circulates air in the interior of the base 31 and, if desired, can also force air to flow into a compartment 127 between the top wall 46 of the base 31 and the bottom wall 50 of the bowl 32. To this end, the upper side of the pulley 40 is provided with suitably inclined vanes or blades 43. The teeth 41 at the periphery of the pulley 40 mate with the teeth of the belt 39. A centrally located hub 44 of the pulley 40 is affixed to the spindle or shaft 42 by a suitable washer and nut (shown in the lower part of FIG. 10); however, other types of connections can be used with equal or similar advantage.

The exact configuration and/or distribution of vanes 43 on the pulley 40 forms no part of the present invention. Such vanes can be designed in any conventional way as long as rotation of the pulley 40 entails the circulation of requisite quantities of air.

The base 31 of the housing 30 comprises a lower section which contains the pulley 40 and an upper section 45 which includes the top wall 46 and is separably secured to the lower section in a manner not forming part of the invention. The base 31 is caused to rest on the surface of a table or counter when the food processor is in actual use. The top wall 46 has an opening 47 which permits the shaft 42 to pass upwardly into the interior of a sleeve-like insulating member 52. The periphery of the top wall 46 has a stepped portion 48 which connects this wall with the circumferentially extending wall of the top section 45 of the base 31. The bottom wall 50 of the bowl 32 has downwardly extending legs 49 which surround the stepped portion 48 of the top wall 46 and define therewith a clearance or gap 126 for admission of air into the compartment 127 between the top wall 46 and bottom wall 50. The legs 49 can constitute integral parts of the bowl 32. These legs also hold the bowl 32 against lateral movement with reference to the base 31. The clearance 126 communicates with the compartment 127 by way of spaces between neighboring legs 49 which are distributed in the circumferential direction of the stepped portion 48.

The bottom wall 50 of the bowl 32 has a sleeve-like extension 51 which extends upwardly and away from such bottom wall and spacedly surrounds the upper portion of the shaft 42. As can be seen in FIG. 10, the extension 51 projects well into the interior of the bowl 32. That portion of the shaft 42 which is surrounded by the extension 51 has several sections of different diameters including two axially fluted or grooved sections 53 which are axially spaced apart from one another. The sections 53 serve to establish a non-rotatable connection between the shaft 42 and the respective portions of the insulating sleeve 52 which is made of a suitable synthetic plastic material and the upper end portion of which is closed. The lower end portion 54 of the sleeve 52 constitutes a disc-shaped leg which is installed in the central portion of the compartment 127 and surrounds the lower part of the lower fluted section 53 of the shaft 42. One of the functions of the disc-shaped leg 54 is to expel from the compartment 127 any liquids which are confined in the bowl 32 and flow therein from an annular space 129 into the compartment 127. The disc-shaped portion or leg 54 propels such liquids radially outwardly and causes them to leave the food processor by way of the spaces between the legs 49 and clearance or gap 126. The annular space 129 surrounds the extension 51 of the bottom wall 50 and is surrounded by an the outer tubular portion 59 of an adapter 56.

The external surface of the insulating sleeve 52 has coupling elements 55 which cooperate with complementary coupling elements 58 in the interior of the adapter 56 to transmit torque from the shaft 42 to the adapter by way of the sleeve 52. When seen from above, the coupling elements 55 and 58 have an undulate profile and can be said to include two annuli of mating teeth which ensure predictable transmission of torque from the shaft 42 to the adapter 56. The flanks of mating teeth forming part of the coupling elements 55 and 58 preferably extend substantially radially of the shaft 42. The form-locking connection between the coupling elements 55 and 58 is established as soon as the adapter 56 is slipped onto the sleeve 52 to assume the position which is shown in FIG. 10.

The adapter 56 comprises an inner tubular portion 57 which is provided with the coupling elements 58 and thus receives torque from the sleeve 52, and the aforementioned outer tubular portion 59 which spacedly surrounds the inner tubular portion 57 and transmits torque to the whipping tool 170. The tubular portions 57 and 59 are open from below. The tubular portion 57 extends between the sleeve 52 and the extension 51 and defines with the latter an annular space 128 which communicates with the annular space 129 as well as with the compartment 127. The space 129 is closed from above because the upper end of the outer tubular portion 59 is integral with the inner tubular portion 57.

The means for transmitting torque from the outer tubular portion 59 of the adapter 56 to the upwardly extending centrally located portion or hub 171 (FIG. 12) of the tool 170 comprises a second coupling having external coupling elements 60 on the lower part of the outer tubular portion 59 and internal coupling elements 61 (see particularly FIG. 12) in the hub 171 of the tool 170. The coupling elements 60 and 61 can constitute annuli of teeth which are uniformly distributed about the shaft 42 and mate with each other in response to axial (downward) movement of the tool 170 to the position which is shown in FIG. 10. Each of the coupling elements 60, 61 (when looked at from above) has·a substantially undulate shape, i.e., its teeth alternate with tooth spaces whereby the teeth of the element 60 extend into the tooth spaces of the element 61 and vice versa.

As mentioned above, the couplings including the elements 55, 58 and 60, 61 can be engaged or disengaged by moving the respective parts axially of the shaft 42. However, it is equally possible to provide at least one of these couplings with coupling elements which extend helically so that engagement of the adapter 56 with the sleeve 52 and/or engagement of the adapter 56 with the tool 170 requires a combined axial an angular movement of the adapter relative to the sleeve and of the tool 170 relative to the adapter. Slightly inclined coupling elements 61 can be seen in FIG. 12.

Figure 11:
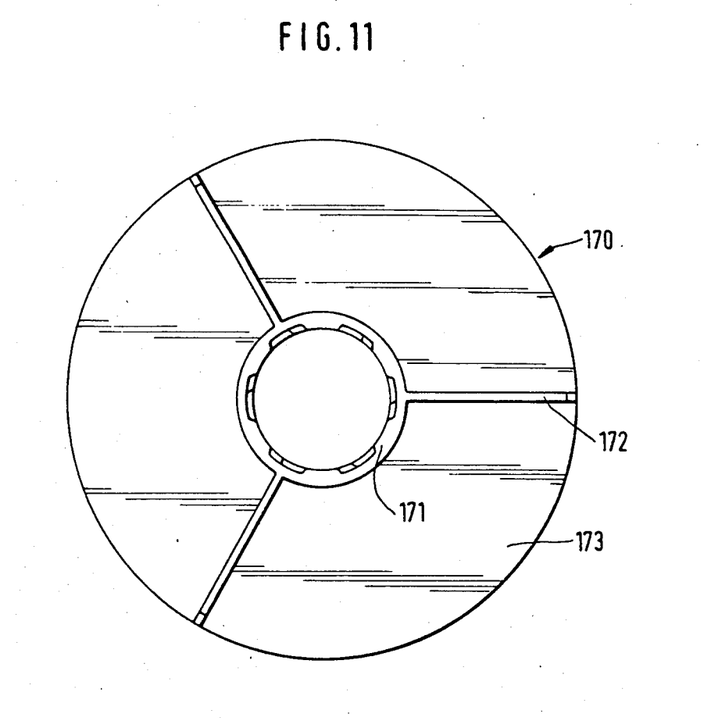
FIG. 11 is a bottom plan view of the whipping tool which is used in the food processor of FIGS. 9 and 10.
Figure 12:
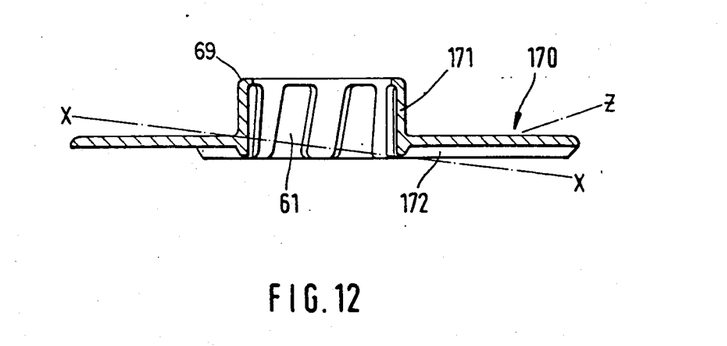
FIG. 12 is an axial sectional view of the whipping tool which is shown in FIGS. 9 to 11.

The details of the whipping tool 170 are shown in FIGS. 11 and 12. The disc-shaped portion of the tool 170 has a smooth upper side and the hub 171 extends beyond such upper side. This hub surrounds the coupling elements 61. The underside of the disc-shaped portion of the tool 170 has three equidistant partitions 172 in the form of straight ribs which are disposed between radially outwardly diverging air channels 173. The inlets 174 of these channels (such inlets are disposed between the lower end face of the hub 171 and the upper side of the bottom wall 50 of the bowl 32) receive air from the aforementioned annular space 129 between the extension 51 of the bottom wall 50 and the outer tubular portion 59 of the adapter 56. The space 129 forms part of a passage which admits or supplies air to the channels 173 and further includes the annular space 138 between the extension 51 and the inner tubular portion 57 of the adapter 56 as well as the compartment 127, the spaces between the legs 49 and the clearance 126. A portion of such passage is defined by the disc-shaped portion or leg 54 of the sleeve 52 because air streams flowing from the compartment 127 into the space 128 sweep along the external surface of the leg 54.

When the tool 170 is properly installed in the bowl 32, the undersides of the channels 173 are at least substantially sealed by the upper side of the bottom wall 50. The directions in which the air streams flow from the compartment 127 into the channels 173 at the underside of the disc-shaped portion of the tool 170 are indicated by the arrows A. The outlets 101 of the channels 173 are adjacent to the periphery of the tool 170 and admit air into the annular clearance between the periphery of the tool and the circumferential wall of the bowl 32 close to the upper side of the bottom wall 50.

The aforedescribed passage (arrows A) for the flow of air from the atmosphere to the inlets 174 of the channels 173 at the underside of the disc-shaped portion of the whipping tool 174 can be simplified or replaced with more complex passages. All that counts is to ensure that the inlets 174 receive requisite quantities of air when the adapter 56 is driven to transmit torque to the whipping tool 170. The annular spaces 128, 129 of the just discussed passage communicate with one another in the region of the upper end of the extension 51. The bowl 32 can contain a supply of cream which is to be whipped in response to rotation of the tool 170 and resulting admission of air into the gap around the periphery of the tool at a level above the bottom wall 50 of the bowl 32. Repeated changes in the direction of air which flows along the passage defined by arrows A are often desirable and advantageous, for example, to segregate the admitted atmospheric air from impurities which can be entrained into the compartment 127.

The upper portion 69 of the hub 171 of the whipping tool 170 is bent slightly inwardly so that it can determine the extent to which the tool is slipped onto the lowermost part of the outer tubular portion 59 of the adapter 56. This also determines the distance between the undersides of the partitions 172 and the upper side of the bottom wall 50 as well as the width of inlets 174 which admit air from the annular space 129 into the respective channels 173. As a rule, the dimensions of the partitions 172 and the position of the upper end portion 69 of the hub 171 will be selected in such a way that the partitions 172 are in actual contact with or are immediately adjacent to the upper side of the bottom wall 50. The end portion 69 of the hub 171 further enables the person in charge to remove the adapter 56 with the tool 170 because a pull upon the upper end portion of the adapter in a direction to lift it out of the bowl 32 upon detachment of the cover 34 will entail a lifting of the tool 170, i.e., lifting of the adapter 56 will disengage the coupling 55, 58 but the coupling 60, 61 will remain intact.

As mentioned above, the improved food processor and its whipping tool can be used for the processing of a wide variety of edible substances, such as cream, mayonnaise, egg whites and many others. The improved whipping tool (such as the tool 170) not only performs a desirable stirring or mixing action but it also introduces into the material in the bowl 32 finely atomized particles of air to produce the desirable whipping effect. When the tool 170 rotates, it causes the material in the bowl 32 to move toward the internal surface of the circumferential wall of the bowl under the action of centrifugal force, and such material gathers in the gap surrounding the disc-shaped portion of the whipping tool 170 close to the bottom wall 50 to form therein a bead-like mass which is uniformly and thoroughly permeated with minute air bubbles. It has been found that such combined stirring and air-admitting action of the improved whipping tool ensures surprisingly rapid conversion of the introduced material into a processed product and that this also holds true when the food processor is used to process relatively large quantities of cream, egg whites, mayonnaise and the like.

It will be noted that the tool 170 deviates from the previously described tools 14 and 14' in that its disc-shaped portion does not have any openings or otherwise configurated inlets for admission of air into the channels 173. Instead, such channels receive air from inlets 174 which are adjacent to the lower end face of the hub 171, i.e., from inlets between such lower end face and the bottom wall 50 of the bowl 32.

The adapter 56 has a smaller-diameter upper portion or extension 76. The extension 76 of the illustrated adapter 56 terminates at the underside of the cover 34 adjacent to the food admitting means 35. The underside of the cover 34 has a female bearing portion 77 which is an annular socket serving to receive a bearing pin 78 which is recessed into a bore 79 at the top of the extension 76. When the cover 34 is properly positioned on the circumferential wall of the bowl 32, the upper portion of the bearing pin 78 enters the socket 77 and thus ensures that the adapter 56 is held against wobbling in the interior of the bowl 32 when the motor in the housing 30 is on. An advantage of the illustrated bearing 77-79 is its simplicity and also that it allows for removal of the cover 34 or renewed placing of the cover in the illustrated position with little loss in time. The bearing pin 78 is preferably slidable into and out of the socket 77 with a minimum of effort or with no effort at all.

The upper portion or extension 76 of the adapter 56 is provided with external ribs 80 or analogous coupling elements which enable the user to attach to the adapter a cutting, slicing, dicing, kneading or other tool which is then used to process the material that is admitted into the bowl 32 via tubular food admitting means 35. The configuration and/or orientation of the coupling elements 80 may be similar to or identical with that of the coupling elements 60. It is also possible to use the coupling elements 80 for engagement with complementary coupling elements of a second adapter or carrier which can be slipped onto the extension 76 of the illustrated adapter 66 and can carry a single tool or any one of a variety of slicing, dicing, shredding and/or other types of tools.

The food processor of FIGS. 9-10 and the whipping tool 170 of FIGS. 11 and 12 exhibit the advantage that the whipping tool is very simple, compact and inexpensive. Thus, the disc-shaped portion of this tool need not be provided with any air-admitting inlet openings because the mounting of the hub 171 with reference to the bottom wall 50 of the bowl 32 is such that the inlets 174 are formed between the lower end face of the hub 171 and the upper side of the bottom wall 50. The hub 71 of the tool 170 cooperates with the bottom wall 50 to effect a 90-degree change in the direction of air flow from the space 129 into the channels 173, and such 90-degree deflection follows a substantially 180-degree deflection while the air flows from the inner annular space 128 into the outer annular space 129. The advantages of repeated deflection of air on its way into the channels 173 were pointed out above. The number of channels 173 and partitions 172 can be increased to four or more. It has been found, however, that a tool 170 with three equidistant partitions 172 operates quite satisfactorily and can rapidly complete the processing of cream and analogous foodstuffs.

Still further, and whereas FIGS. 9 and 10 show couplings (55, 58 and 60, 61) which, when viewed from above, have a substantially undulate line of contact between the two sets of teeth, other types of couplings can be used with equal or similar advantage. The illustrated couplings are simple, inexpensive, easy to clean and capable of establishing between the respective parts form-locking connections which guarantee a highly predictable transmission of torque with a minimum of wear upon the elements of the couplings.

The advantages of the disc-shaped portion or leg 54 of the insulating sleeve 52 have been pointed out above. Thus, this part not only guides the air streams which flow in the directions indicated by the arrows A but it also ensures that any liquid which has penetrated into the compartment 127 flows radially outwardly and leaves the compartment by way of the spaces between the legs 49 and annular gap 126.

Figure 13:
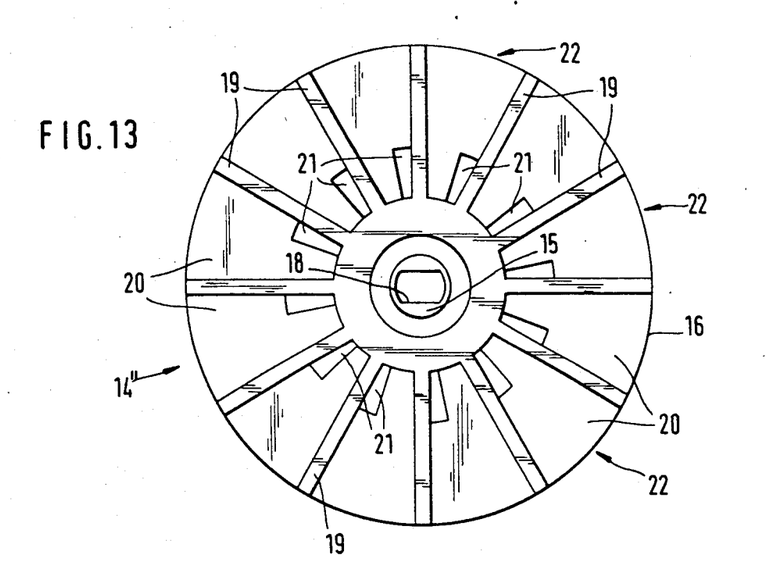
FIG. 13 is a bottom plan view of an additional whipping tool which can be used in the food processor of FIGS. 8 and 10 in lieu of the tool shown in FIGS. 11 and 12.
Figure 14:
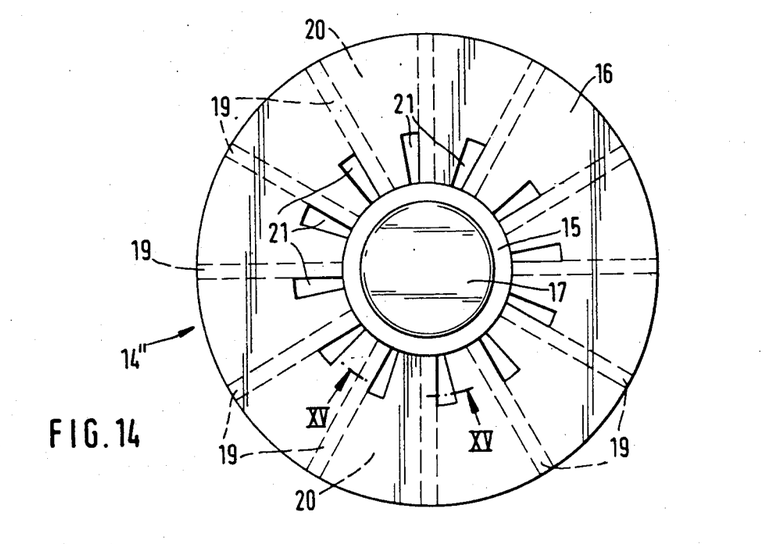
FIG. 14 is a plan view of the whipping tool which is shown in FIG. 13.
Figure 15:
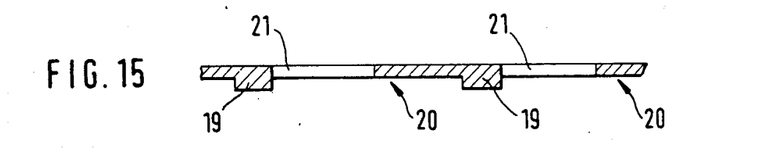
FIG. 15 is an enlarged sectional view as seen in the direction of arrows from the line XV—XV of FIG. 14.

FIGS. 13 to 15 show a further whipping tool 14" which can be used in lieu of the tool 14 or 14' in the food processor of FIG. 1 or in a similar machine. For the sake of simplicity, all such parts of the tool 14" which are identical with or clearly analogous to the corresponding parts of the tool 14 are denoted by similar reference characters. The inlets 21 are openings in the flat disc-shaped second portion 16 of the tool 14" and are closely adjacent to the hub 15 which has a knob-like handle 17, the same as the tool 14. The axial bore 18 in the hub 15 has a non-circular outline (at least in part) so that it can receive torque from the shaft of the means for rotating the tool 14".

Figure 4:
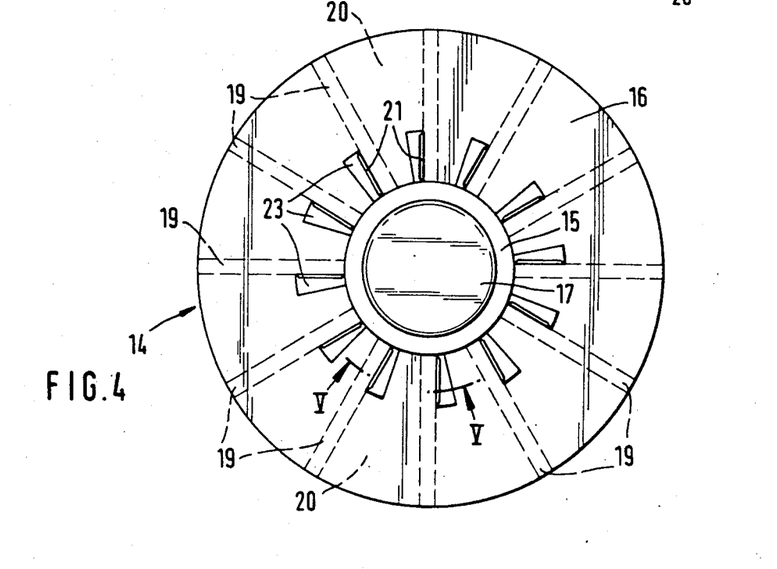
FIG. 4 is a plan view of the whipping tool as seen in the direction of arrow IV in FIG. 2.
Figure 5:
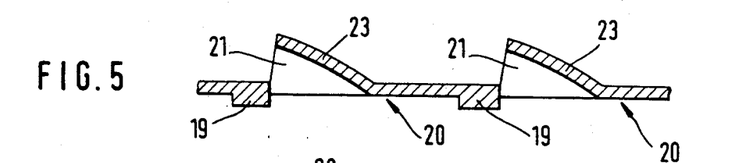
FIG. 5 is an enlarged fragmentary sectional view as seen in the direction of arrows from the line V—V in FIG. 4.

An advantage of the tool 14" is that it can be mass-produced at a reasonable cost since it need not be provided with hood-shaped portions 23 of FIGS. 2-4 and/or with the tubular component 24 of FIGS. 6 to 8.

The rib-like partitions 19 at the underside of the disc-shaped portion 16 of the tool 14" are disposed between the neighboring channels 20, and their innermost portions flank the respective inlet openings 21 in the portion 16. The bottom wall of the bowl 12 is not shown in FIGS. 13 to 15; the upper side of such bottom wall is closely adjacent to the undersides of the partitions 19 when the tool 14" is properly inserted into the bowl.

In the embodiment of FIGS. 13 to 15, each of the channels 20 receives air from a single inlet opening 21. However, it is equally possible to provide for each channel 20 two or even more openings. Furthermore, and even though FIGS. 13 and 14 show that each of the inlet openings 21 has a substantially trapeziform outline, it is equally possible to provide the disc-shaped portion 16 of the tool 14" with circular, square, rectangular, oval and/or otherwise configurated inlet openings. The inlet openings 21 are exposed for admission of air as soon as the whipping tool 14" is set in rotary motion because the material which has been admitted into the bowl is compelled to move radially outwardly and away from the hub 15 under the action of centrifugal force.

The tool 14" is assumed to rotate in a clockwise direction, as viewed in FIG. 13, when the food processor employing such tool is in actual use. The rotating tool 14" actually sucks air into the channels 20 and causes such air to leave the channels at the outlets 22 so that the expelled air penetrates into the material which partially fills the bowl and gathers in the aforediscussed annular gap adjacent to the periphery of the disc-shaped portion 16.

Figure 16:
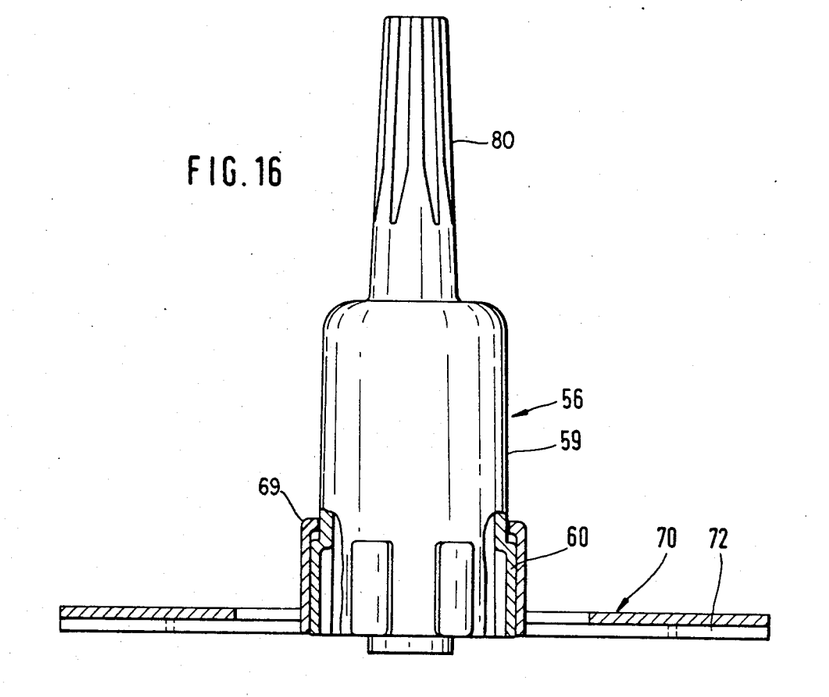
FIG. 16 is an axial sectional view of still another whipping tool which can be used in the food processor of FIGS. 9-10, further showing an adapter which serves to transmit torque to the hub of the tool.
Figure 17:
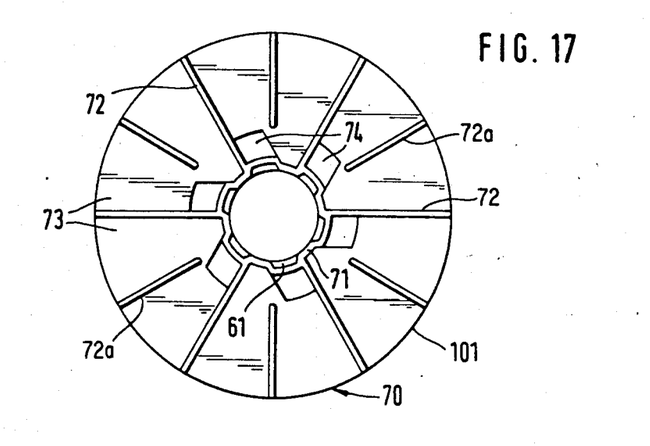
FIG. 17 is a smaller-scale bottom plan view of the tool which is shown in FIG. 16.

FIGS. 16 and 17 show a further whipping tool 70 and the associated adapter 56 which may be identical with or similar to the adapter of FIG. 10. The tool 70 can be used in the food processor of FIGS. 9 and 10 in lieu of the tool 170.

The underside of the disc-shaped portion of the tool 70 has a plurality of partitions in the form of straight radially extending ribs 72 defining air channels 73 each of which diverges radially outwardly and has an outlet 101 at the circumference of the tool 70. The inlets 74 are air admitting openings which are provided in the disc-shaped portion of the tool 70 and are closely adjacent to the hub 71. The underside of the disc-shaped portion of the tool 70 is further formed with relatively short ribs 72a which extend radially of the tool and alternate with the full-length ribs 72 so that a portion of each channel 73 is divided into two narrower channels, i.e., the number of outlets 101 is increased to twice the number of the channels 73. The radially innermost portions of the longer ribs 72 flank the respective inlet openings 74 adjacent to the outer side of the hub 71. The illustrated substantially square or rectangular inlet openings 74 can be replaced with triangular, pentagonal, oval, circular and/or otherwise configurated inlet openings without departing from the spirit of the invention.

The coupling elements 61 of the hub 71 can be configurated in the same way as the similarly referenced coupling elements in FIG. 12, and the same holds true for the coupling elements 60 at the lower end of the outer tubular portion 59 of the adapter 56. The inwardly extending upper portion 69 of the hub 71 is spaced apart from the upper ends of the coupling elements 60 on the outer tubular portion 59 of the adapter 56 to thus ensure that the undersides of the ribs 72 and/or 72a will come to rest on the upper side of the bottom wall 50 of the bowl 32 (not shown in FIGS. 16 and 17). As mentioned in connection with FIGS. 9 to 12, the inwardly extending portion 69 of the hub 71 further serves as a means to ensure that the tool 70 is lifted with the adapter 56 when the latter is engaged by the tubular portion 59 or thereabove and is lifted out of the bowl.

The adapter 56 of FIG. 16 is also provided with coupling elements 80 which enable its upper part to support a second adapter for any one of an assortment of tools or to directly support and transmit torque to a slicing, dicing, scraping, grating and/or other tool, e.g., a tool for cutting potatoes preparatory to the making French fried potatoes, a tool serving to grate parmesan and/or other types of cheese and/or any other suitable tool which is configurated to engage with the coupling portion 80 and to thereupon share the angular movements of the adapter 56.

The whipping tools of FIGS. 12 to 17 are simpler and less expensive than the tools 14 or 14' because they need not be provided with hood-shaped portions 23 (FIGS. 2-5) and/or with the tubular extensions 24 and blades 25 (FIGS. 6-8). It has been found that the quality of the whipping action of tools which are shown in FIGS. 12-17 is not inferior to that of the tools which are shown in FIGS. 2 to 8.

It is also possible to modify the illustrated whipping tools by reducing the number of air-admitting inlets to less than the number of channels or vice versa. This depends on the desired quantity of air which is to be introduced into the bowl when the prime mover is started and the tool is set in rotary motion.

The improved food processor and its whipping tool are susceptible of many additional modifications without departing from the spirit of the invention. For example, the disc-shaped portion of the whipping tool can be located in a plane which is not normal to the axis of the hub. This is indicated in FIG. 12 by a phantom line X—X. Such mode of orienting the disc-shaped portion of the whipping tool can enhance the whipping and/or stirring action in connection with the treatment of certain types of foodstuffs. Furthermore, it is also within the purview of the invention to place the major part of the disc-shaped portion of the whipping tool into a plane which is normal to the axis of the hub but to incline one or more selected parts of the disc-shaped portion in a manner as shown at Z in FIG. 12. Still further, the configuration of the channels at the underside of the disc-shaped portion of the whipping tool can be varied practically at will. Also, the hub of the whipping tool can be designed to constitute an impeller which forces relatively large quantities of air into the inlets of the adjacent channels. Thus, the hub can act not unlike a blower to further enhance the aerating and whipping action of the improved tool. It is also clear that the improved whipping tool need not be removably installed in the bowl of a food processor but can be permanently installed in the bowl if the machine is designed to treat one and the same type of material or certain related or analogous materials. As a further modification, the whipping tool can be more or less permanently installed in its bowl and the latter can be detachably mounted in a food processor, preferably a processor which employs rotating means including an electric motor or another suitable prime mover. The illustrated and described separability of the whipping tool is preferred at such time because this renders it possible to utilize such tool in many types of existing food processors.

An important advantage of the improved food processor and of its improved whipping tool is that the machine can process large or small quantities of cream or the like within surprisingly short intervals of time and also that the quality of the processed material is highly satisfactory. This is achieved without the utilization of complex transmissions or electronic speed regulating means for the prime mover. The improved tool performs several desirable, important and advantageous functions such as adequate stirring or mixing of the contents of the bowl as well as the introduction of air in the form of minute bubbles which ensure that the consistency of the processed product is highly satisfactory, either for immediate consumption or for further processing. Moreover, the feature that the whipping tool propels or induces the material in the bowl to advance under the action of centrifugal force and to accumulate in the form of a bead along the periphery of the rotating whipping tool even further enhances predictable introduction of large quantities of air into the material to thus ensure rapid completion of the combined mixing and whipping operation.

While it is also within the purview of the invention to construct the disc-shaped portion of the improved whipping tool in the form of a twin walled structure with the air channels disposed between the two walls, the illustrated construction (with the partitions at the underside of the disc-shaped portion and in direct contact with or in immediate proximity to the bottom wall of the bowl) has been found to be particularly desirable and advantageous because of the lower manufacturing cost, lower weight, reduced space requirements in the interior of the bowl and convenience of cleaning.

The incorporation of features which are shown in FIG. 12 by phantom lines (i.e., the utilization of a wobbling disc-shaped portion or of a disc-shaped portion one or more parts of which are inclined with reference to the remaining part or parts) has been found to be highly desirable and advantageous in connection with the processing of certain foodstuffs which require particularly thorough intermixing and highly pronounced homogenization of their ingredients.

The entire whipping tool can be made of a single piece of metallic or synthetic plastic material. It has been found that the improved whipping tool can treat large or small quantities of cream or the like with a heretofore unmatched degree of predictability in spite of the fact that the speed of the means for rotating the tool need not be changed at all when a larger batch of material in the bowl is followed by a much smaller batch or vice versa. This contributes to simplicity of the rotating means and of the controls therefor and hence to much lower cost of the entire food processor. The operation of the improved whipping tool is such that it does not spray the material around the bowl when the machine is in actual use, irrespective of whether the bowl contains a larger or a smaller (even very small) quantity of cream or the like.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A food processor for whipping cream, egg whites, mayonnaise and analogous foodstuffs, comprising a base; a bowl on said base and having a bottom wall; a substantially disc-shaped rotary whipping tool disposed in said bowl and having an underside facing said bottom wall and a plurality of partitions provided at said underside, closely adjacent said bottom wall and defining a plurality of channels extending substantially radially of said tool, each of said channels having an air-admitting inlet nearer to and an air-discharging outlet more distant from the axis of said tool; means for guiding air to the inlets of said channels, including a top wall of said base spaced apart from and disposed below said bottom wall, said walls defining a portion of at least one passage for the flow of air into said inlets; and means associated with said base for rotating said tool with reference to said bowl to thus establish a substantially radially outwardly oriented flow of air through said channels and into the food which is confined in said bowl.

2. The food processor of claim 1, wherein said rotating means includes a prime mover and said tool has a central portion adjacent said inlets and arranged to receive torque from said prime mover.

3. The food processor of claim 1, wherein said tool has a marginal portion and said outlets are disposed in the region of said marginal portion.

4. The food processor of claim 1, wherein said channels have open undersides and said bottom wall at least substantially seals the undersides of said channels intermediate the respective inlets and outlets.

5. The food processor of claim 1, wherein said bowl further comprises a circumferential wall extending upwardly from said bottom wall and spacedly surrounding said tool so that said tool and said circumferential wall define an annular clearance.

6. The food processor of claim 1, further comprising said housing including a base said rotating means being installed in said housing.

7. The food processor of claim 1, wherein said air guiding means further comprises an extension provided on said bottom wall and extending centrally through said tool, said rotating means comprising a rotary adapter, means for coupling said adapter to said tool and means for driving said adapter, said adapter and said extension defining an annular space communicating with said portion of said passage and with said inlets.

8. The food processor of claim 7, wherein said adapter and said extension further define a second annular space disposed between said first mentioned annular space and said inlets.

9. The food processor of claim 7, wherein said driving means comprises a shaft which is coaxial with said adapter, an electrically insulating sleeve interposed between and arranged to transmit torque from said shaft to said adapter, and means for separably securing said adapter to said sleeve.

10. The food processor of claim 9, wherein said securing means comprises complementary coupling elements provided on said adapter and said sleeve.

11. The food processor of claim 10, wherein said coupling elements comprise annuli of mating teeth on said adapter and said sleeve.

12. The food processor of claim 7, wherein said tool has a smooth surface facing away from and a second surface facing toward said bottom wall, said second surface having three at least substantially equidistant and substantially radially extending partitions disposed between said channels, said coupling means comprising a hub provided on said tool, extending from said first side and receiving torque from said adapter.

13. A food processor for whipping cream, egg whites, mayonnaise and analogous foodstuffs, comprising a bowl having a bottom wall; a substantially disc-shaped rotary whipping tool disposed in said bowl and having an underside facing said bottom wall and a plurality of partitions provided at said underside, closely adjacent said bottom wall and defining a plurality of channels extending substantially radially of said tool, each of said channels having an air-admitting inlet nearer to and an air-discharging outlet more distant from the axis of said tool; means for guiding air to the inlets of said channels, including a second wall disposed below and defining with said bottom wall a portion of at least one passage for the flow of air into said inlets, and an extension provided on said bottom wall and extending centrally through said tool; and means for rotating said tool with reference to said bowl to thus establish a substantially radially outwardly oriented flow of air through said channels and into the food which is confined in the bowl, said rotating means comprising a rotary adapter, means for coupling said adapter to said tool and means for driving said adapter, said adapter and said extension defining an annular space communicating with said portion of said passage and with said inlets, said driving means comprising a shaft which is coaxial with said adapter, an electrically insulating sleeve interposed between and arranged to transmit torque from said shaft to said adapter, and means for separably securing said adapter to said sleeve, said sleeve including a substantially disc-shaped portion disposed between said walls and forming part of said air guiding means, the air flowing from said portion of said passage, around said disc-shaped portion and into said annular space.

* * * * *